United States Patent [19]
Kodama

[11] Patent Number: 5,905,528
[45] Date of Patent: May 18, 1999

[54] APPARATUS HAVING A MOVING PICTURE RECORDING MODE AND A STILL PICTURE RECORDING MODE AND WHICH IS CAPABLE OF SIMULTANEOUSLY DISPLAYING A REMAINING MEMORY CAPACITY WITH RESPECT TO EACH OF THE RECORDING MODES

[75] Inventor: Shinichi Kodama, Hino, Japan

[73] Assignee: Olympus Optical Co., Ltd., Tokyo, Japan

[21] Appl. No.: 08/696,438

[22] Filed: Aug. 14, 1996

[30] Foreign Application Priority Data

Aug. 23, 1995 [JP] Japan .................................... 7-214901

[51] Int. Cl.⁶ .................................................. H04N 5/225
[52] U.S. Cl. ............................ 348/220; 348/231; 348/334
[58] Field of Search .................................... 348/333, 334, 348/220, 231, 232, 233; 358/906, 909.1; 386/83, 38, 117, 120, 121

[56] References Cited

U.S. PATENT DOCUMENTS

| | | | |
|---|---|---|---|
| 4,691,253 | 9/1987 | Silver | 358/906 |
| 5,239,380 | 8/1993 | Yokoyama | 348/220 |
| 5,264,939 | 11/1993 | Chang | 348/322 |
| 5,473,370 | 12/1995 | Moronaga | 348/231 |
| 5,726,819 | 3/1998 | Kubo | 358/909.1 |
| 5,734,424 | 3/1998 | Sasaki | 348/220 |

FOREIGN PATENT DOCUMENTS

| | | |
|---|---|---|
| 5-37835 | 2/1993 | Japan . |
| 7-7647 | 1/1995 | Japan . |
| 7-38785 | 2/1995 | Japan . |

*Primary Examiner*—Wendy Garber
*Attorney, Agent, or Firm*—Frishauf, Holtz, Goodman, Langer & Chick

[57] ABSTRACT

A subject image is converted into an electrical picture signal by an imaging device. A mode setter sets either a still picture record mode or a moving picture record mode. A recording device records on a recording medium a still picture in the still picture record mode or a moving picture in the moving picture record mode on the basis of the picture signal from the imaging device. A computer computes the remaining capacity of the recording medium for each of still and moving pictures. A display unit displays the remaining capacity of the recording medium for each of still and moving pictures simultaneously.

6 Claims, 16 Drawing Sheets

```
REMAINING M    **h    **m    **s
REMAINING S    **FRAMES
```

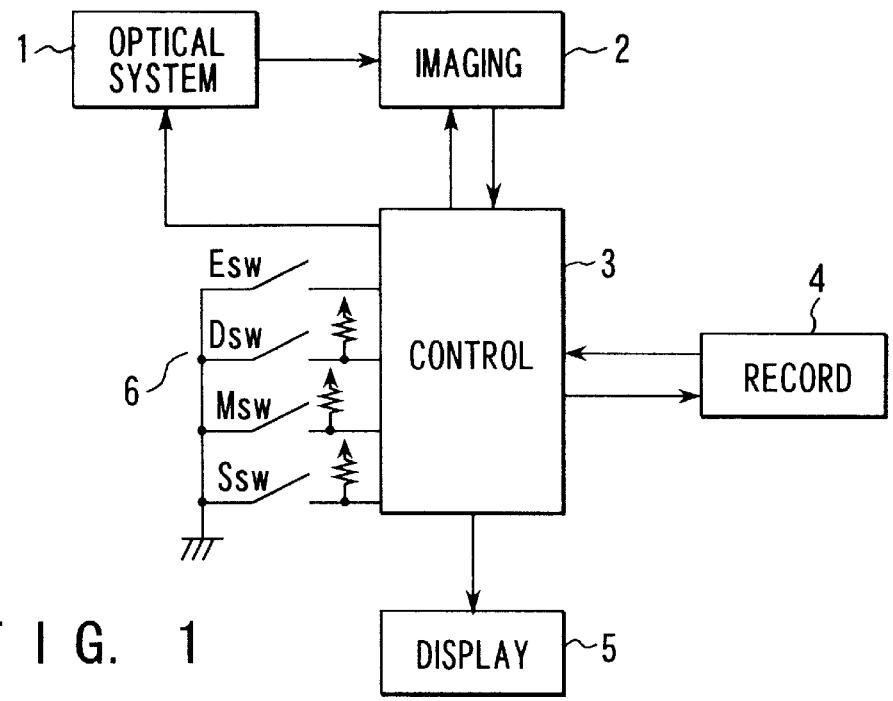
F I G. 1
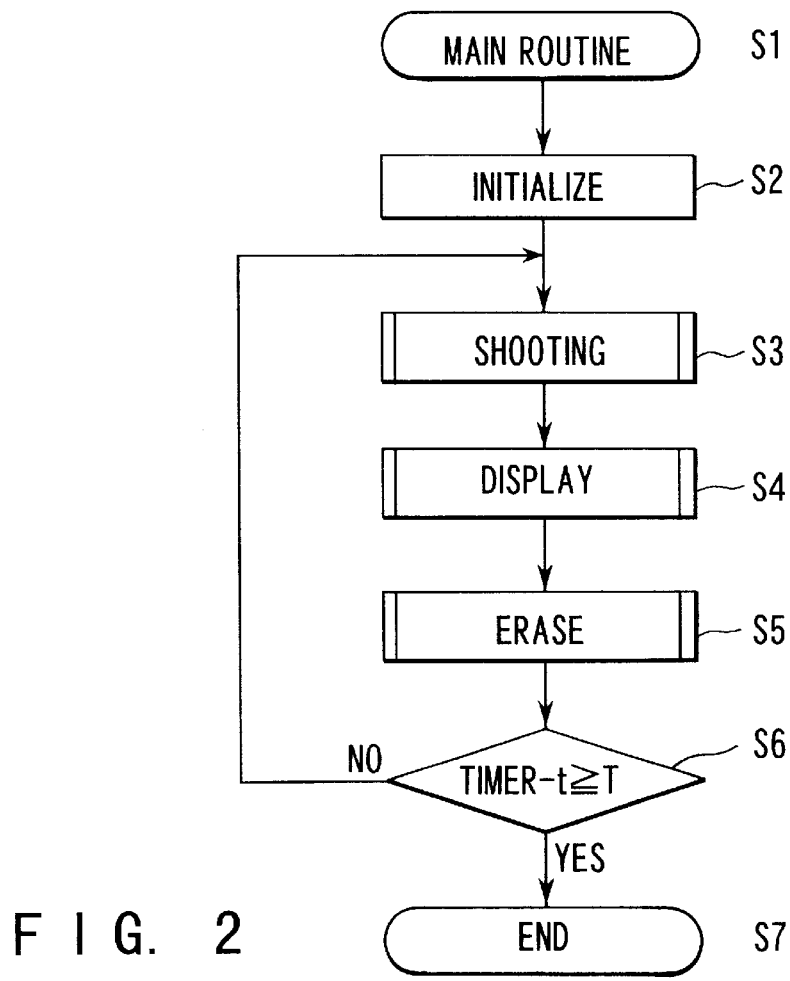
F I G. 2

| | |
|---|---|
| REMAINING M **h **m **s<br>REMAINING S **FRAMES<br><br><br><br>F I G. 4A | REMAINING M **h **m **s<br>REMAINING S **FRAMES<br><br><br><br>F I G. 4E |
| SHOT S **FRAMES<br><br><br><br>F I G. 4B | SHOT S **FRAMES<br><br>REMAINING M **h **m **s<br>REMAINING S **FRAMES<br><br>F I G. 4F |
| SHOT M **h **m **s<br><br><br><br>F I G. 4C | SHOT M **h **m **s<br><br>REMAINING M **h **m **s<br>REMAINING S **FRAMES<br><br>F I G. 4G |
| SHOT S **FRAMES<br>SHOT M **h **m **s<br><br><br><br>F I G. 4D | SHOT S **FRAMES<br>SHOT M **h **m **s<br><br>REMAINING M **h **m **s<br>REMAINING S **FRAMES<br><br>F I G. 4H |

```
          SHOT S   P FRAMES
        A SHOT M  **h  **m  **s
                              TIMES Q

REMAINING S ** FRAMES
        REMAINING M ** h ** m ** s
```

F I G.  8A

```
    SHOT S   ** FRAMES
  A SHOT M  **h  **m  **s
                ** TIMES
```

F I G.  6A

```
    SHOT S No **    **M  **D
              **h   **m  **s

△S        ** FRAMES
    △M        **h **m **s
```

F I G.  8B

```
  SHOT S No **   **M  **D
             **h  **m  **s
```

F I G.  6B

```
  SHOT M No **      **M  **D
   START    **h  **m  **s
   END      **h  **m  **s
   BLOCK    **
```

F I G.  8C

```
  SHOT M No **   **M  **D
   START    **h  **m  **s
   END      **h  **m  **s
```

F I G.  6C

```
    SHOT M No **     **M  **D
               **h   **m  **s
    BLOCK     **
    △S        ** FRAMES
    △M        **h **m **s
```

F I G.  8D

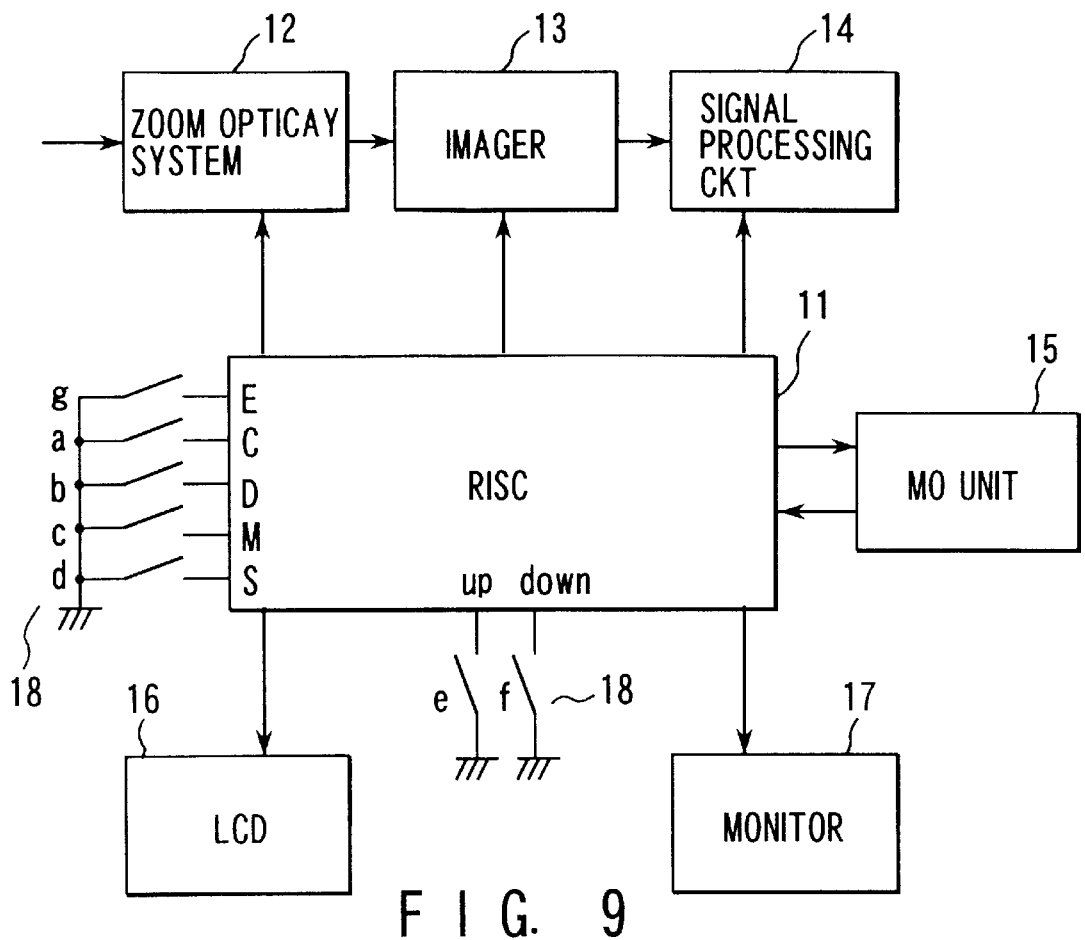
F I G. 9
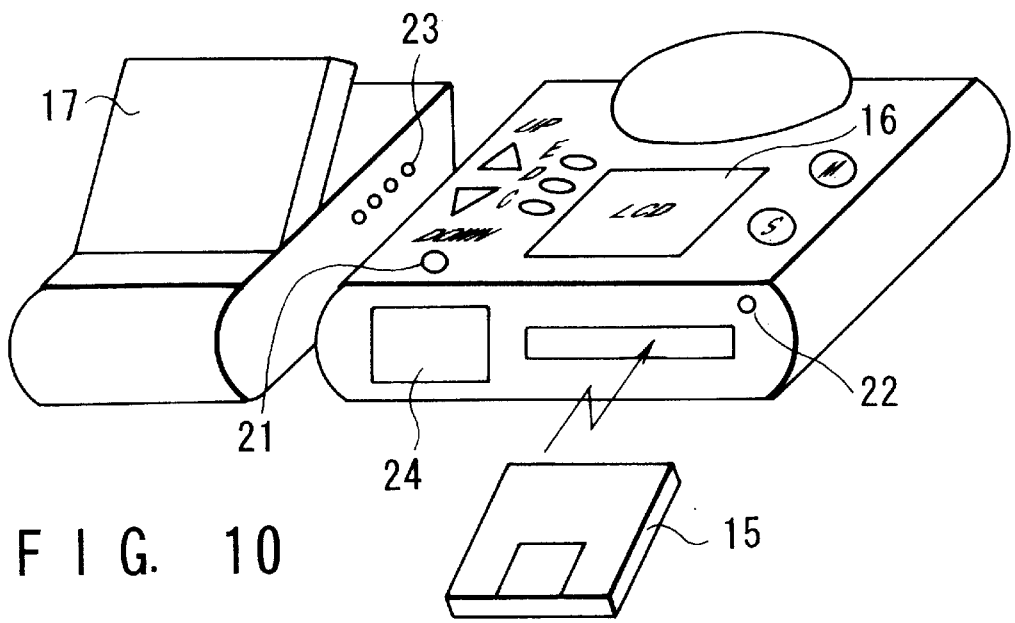
F I G. 10

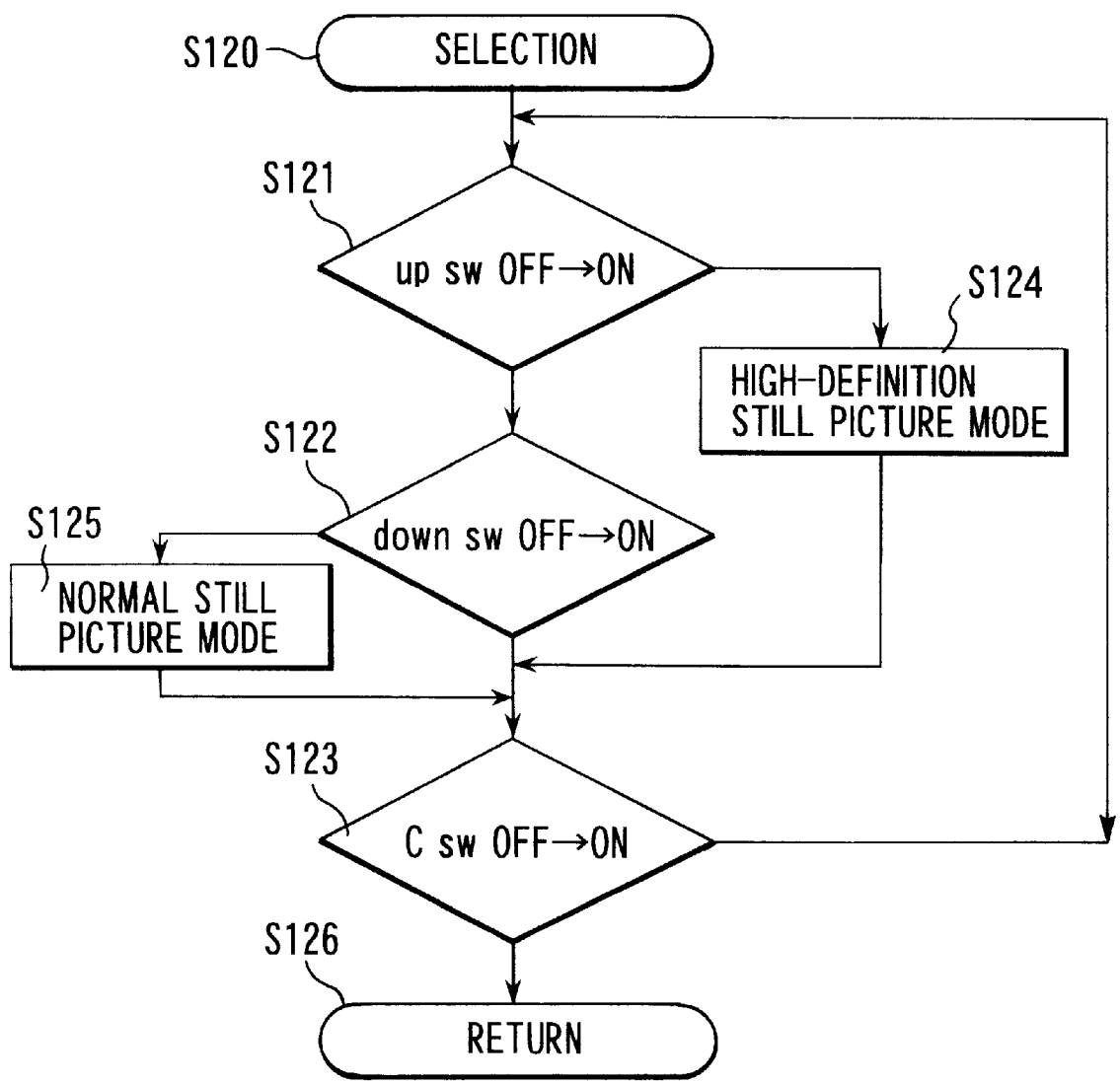
F I G. 12

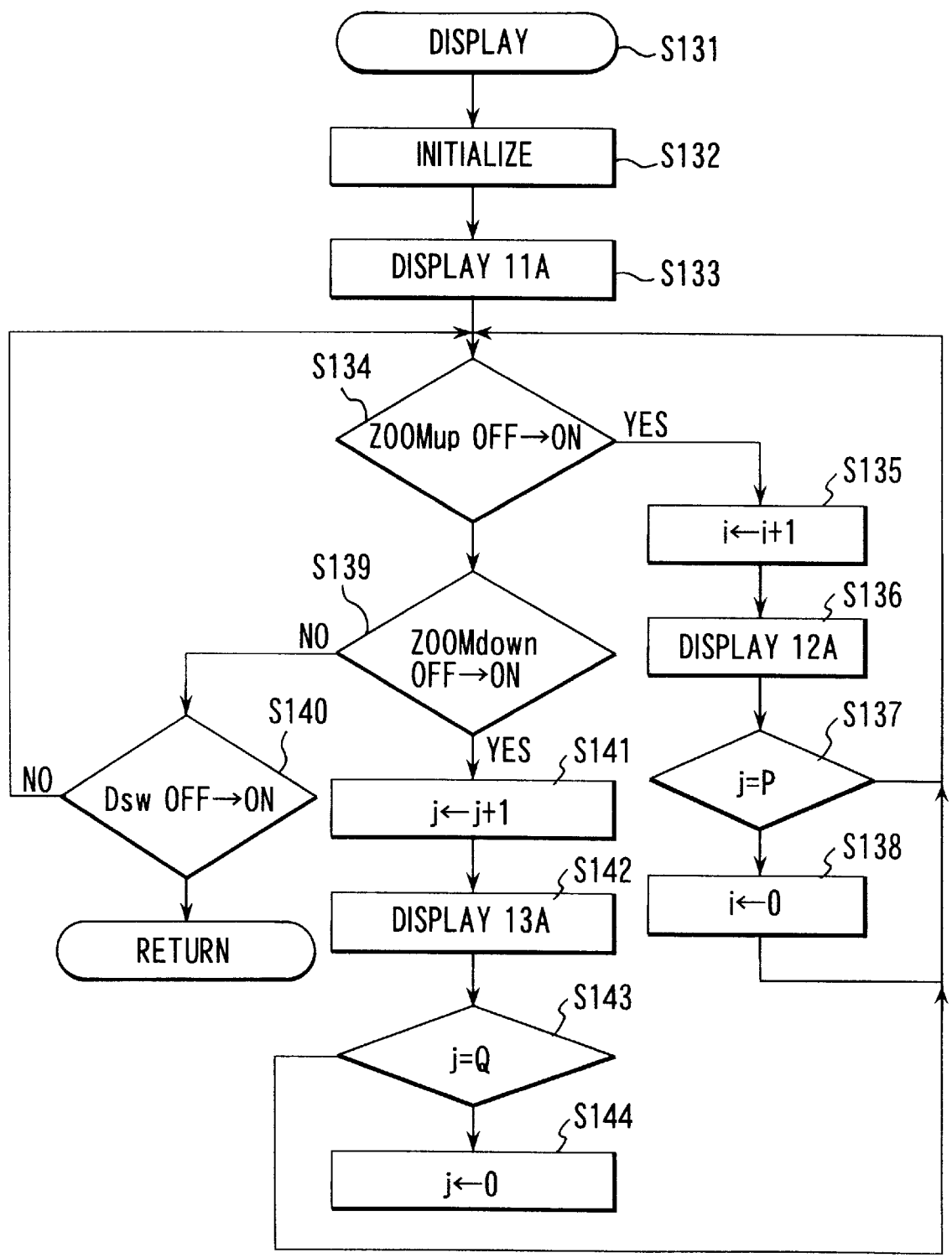
F I G. 13

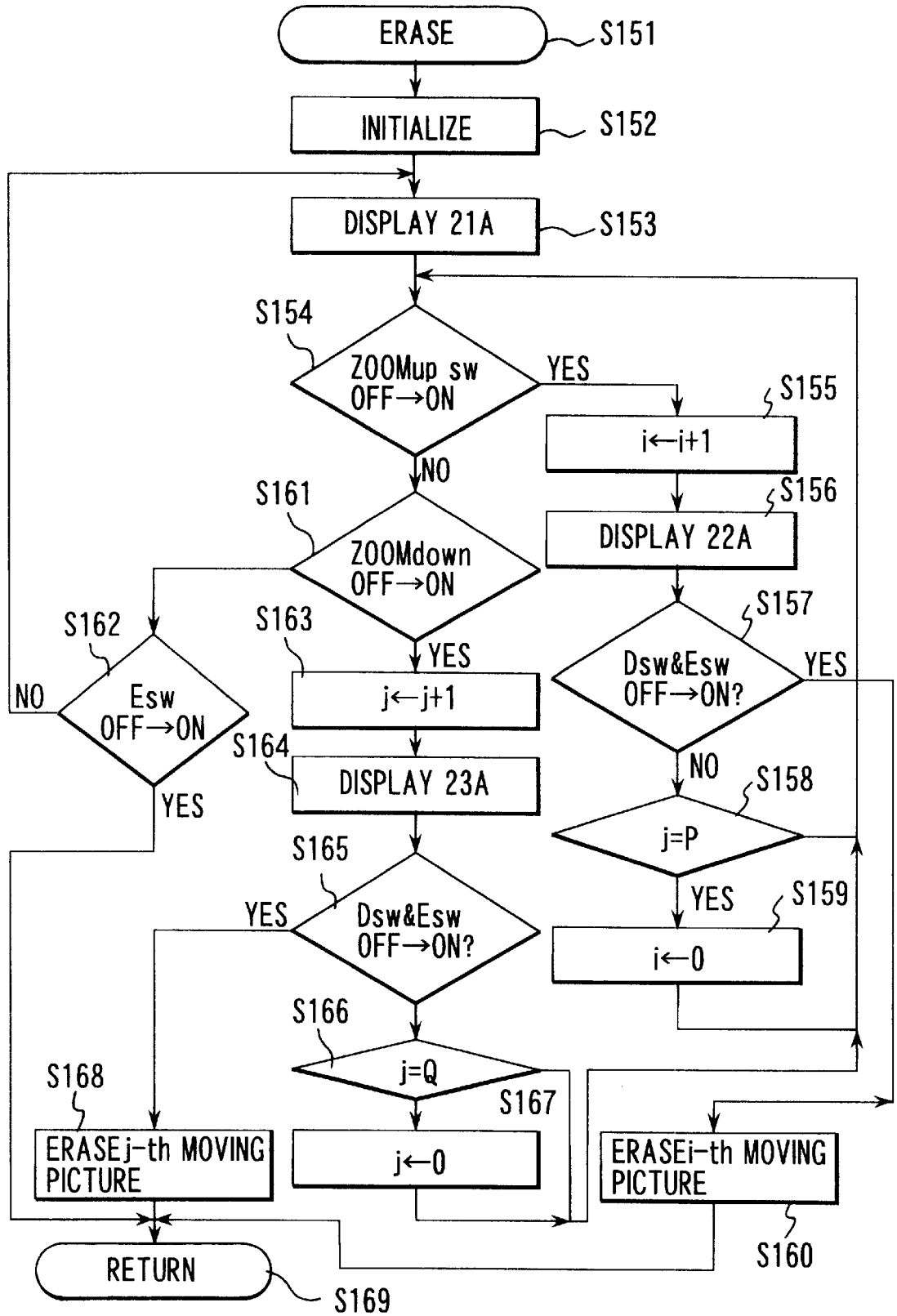
F I G. 14

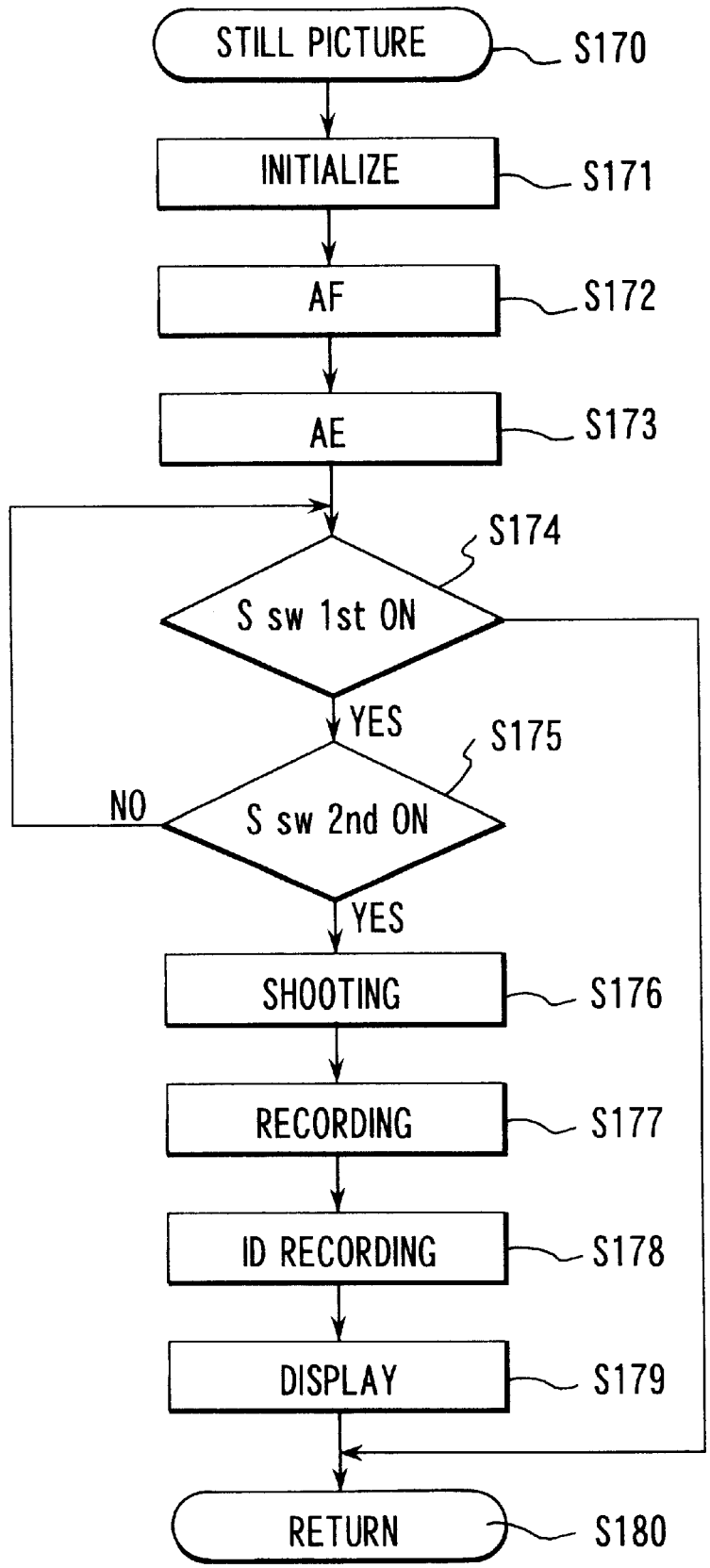
F I G. 15

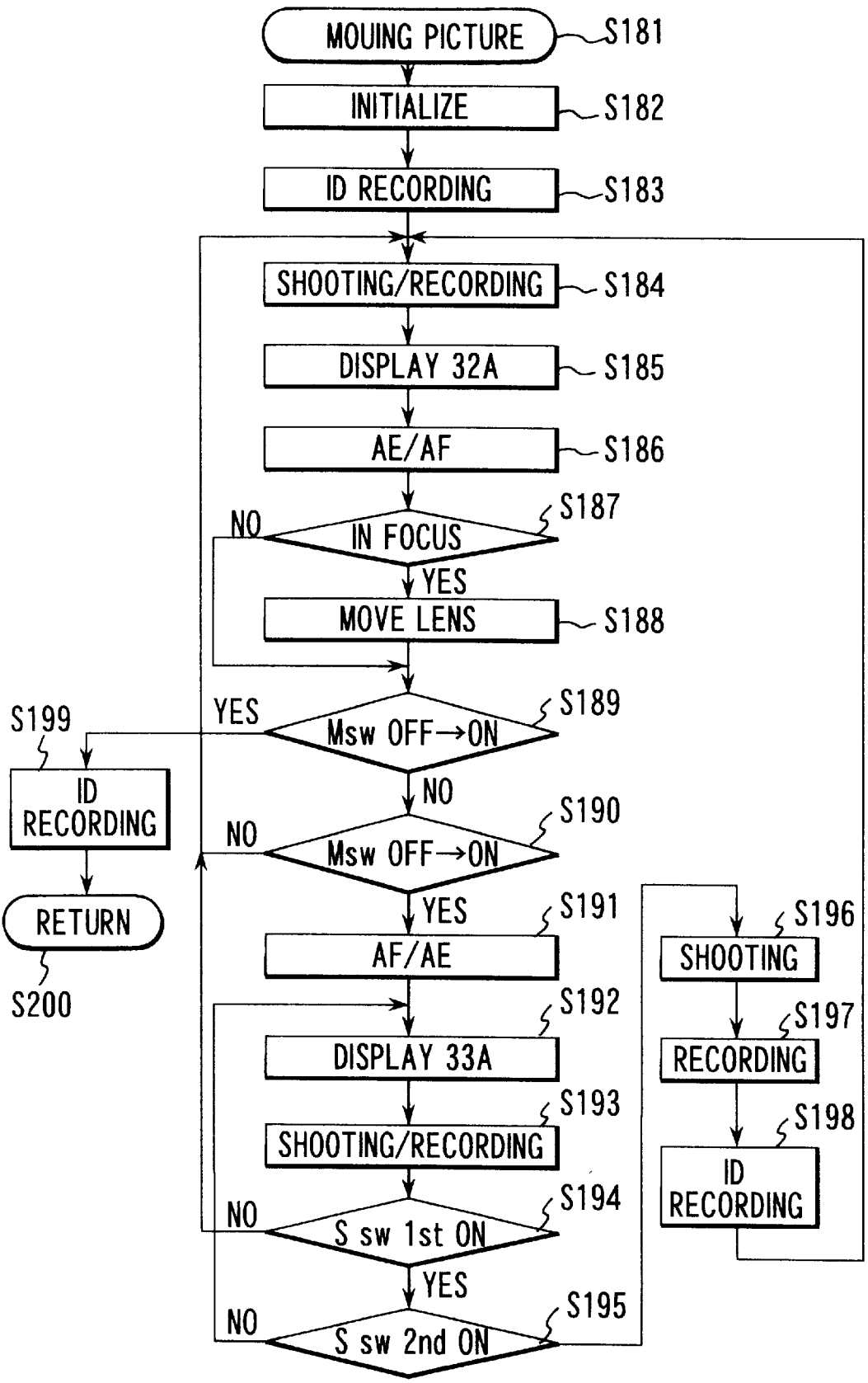
F I G. 16

FIG. 17A

```
REMAINING Hi S  30FREAMES<S>
REMAINING N S 300FREAMES<S>
REMAINING M    10min<S>300M
```

FIG. 17B

```
SHOT  S  29FREAMES
SHOT NS  10FREAMES   S Hi  19
SHOT AM  No.3  06:00
```

FIG. 17C

```
SHOT Hi S  No.3
            95.10.10  00:15:00
```

FIG. 17D

```
SHOT M  No.1
            95.10.10  13:00:00
                      13:03:00
```

FIG. 17E

```
SHOT M  No.3  00:05:00
REMAINING Hi S  14FREAMES
REMAINING N S 149FREAMES
REMAINING M    4min
```

FIG. 17F

```
SHOT Hi S  29FREAMES
SHOT N S   10FREAMES
SHOT A M   No.3  06:00
REMAINING Hi S   30FREAMES
REMAINING N S    300FREAMES
REMAINING M      10min
```

FIG. 17G

```
SHOT N S  No.4
                95.10.10  10:12:00
△Hi S  0.1FREAMES    14:11:10
△N S    1FREAMES
△M      00:00:02
```

FIG. 17H

```
SHOT M  No.3
                95.10.10 14:10:00
△Hi S   30FREAMES
△N S   300FREAMES
△M      00:01:00
```

FIG. 17I

```
SHOT N S  No.11
          95.10.11
REMAINING Hi S   29FREAMES
REMAINING N S    299FREAMES
REMAINING M      9min
```

FIG. 17J

```
SHOT Hi S  No.30
           95.10.12
SHOT M  No.4  00:09:57
REMAINING Hi S   ☼
REMAINING N S   5FREAMES
REMAINING M     0min
```

APPARATUS HAVING A MOVING PICTURE RECORDING MODE AND A STILL PICTURE RECORDING MODE AND WHICH IS CAPABLE OF SIMULTANEOUSLY DISPLAYING A REMAINING MEMORY CAPACITY WITH RESPECT TO EACH OF THE RECORDING MODES

BACKGROUND OF THE INVENTION

1. Field of the Invention

The invention relates to a picture taking apparatus which permits a still picture and a moving picture which are different in picture quality to be recorded simultaneously on the same sensor and, more specifically, to a picture taking apparatus capable of displaying a remaining capacity of a recording medium.

2. Description of the Related Art

In general, still pictures are recorded by film-based cameras or still-video (SV) systems, and moving pictures are recorded by video cameras. Nowadays a wide variety of techniques are proposed for simultaneous recording of still and moving pictures. For example, Japanese Unexamined Patent Publication No. 5-37835 discloses a camera which is compact in size and light in weight and adapted to simultaneously capture a moving picture on video tape and a still picture on silver-based film by the use of a single lens system.

In addition, an SV system has been developed whose mode of operation can be switched into either the moving picture mode or the still picture mode by an operator. For such a system for simultaneous recording of still and moving pictures, it is desired to alert the camera operator of the number of frames left for shooting or the remainder of the recordable time during recording.

In view of this respect, an electronic still camera is disclosed in Japanese Unexamined Patent Publication No. 7-7647 which, in recording still and moving pictures and sound, indicates the remaining capacity of a recording medium according to a mode set. That is, this camera has a feature of displaying the remaining capacity of a recording medium for still picture when a still picture is recorded and the remaining capacity for moving picture when a moving picture shot is recorded.

Moreover, Japanese Unexamined Patent Publication No. 7-38785 discloses a camera which allows the operator to make sure of the used or unused capacity of a recording medium in terms of the number of frames for still pictures and in terms of time for moving picture.

However, the conventional techniques described above suppose that each of still and moving pictures will be shot individually. Thus, the display according to each of the still picture mode and the moving picture mode is merely performed. That is, these conventional techniques do not simultaneously provide information related to the two modes, as is desirable in a system which allows a still picture to be shot while a moving picture is being shot.

In addition, the conventional techniques suppose that still pictures are handled in the same quality as moving picture. However, the picture quality of the moving picture need not be as high as the still image. It is thus desirable to display how much of each of moving and still pictures can be shot with a remaining capacity of a recording medium of an SV system.

SUMMARY OF THE INVENTION

It is therefore an object of the invention to display the remainder of the recording capacity of a recording medium when a moving picture and a still picture of higher quality than the moving picture are simultaneously recorded on the medium through the same sensor.

According to an aspect of the invention there is provided a moving picture and still picture recording apparatus comprising: imaging means for converting the image of a subject into an electrical picture signal; mode setting means responsive to the picture signal from said imaging means for setting either a still picture recording mode or a moving picture recording mode; recording means for recording either a still picture or a moving picture on a recording medium in a mode set by the mode setting means; computing means for computing the remaining capacity of the recording medium for each of the still picture mode and the moving picture mode; and display means for simultaneously displaying the remaining capacity of the recording medium for each of still and moving pictures.

According to another aspect of the invention there is provided a picture taking apparatus having a plurality of shooting modes in which pictures requiring different capacities for storage on a recording medium are taken, comprising: imaging means for converting the image of a subject into an electrical picture signal; mode setting means for setting one of the plurality of shooting modes; recording means for recording the picture signal produced by the imaging means on a recording medium according to a shooting mode set by the mode setting means; computing means for computing the remaining capacity of the recording medium for each of the shooting modes; and displaying means for displaying the remaining capacity of the recording medium computed by the computing means.

According to still another aspect of the invention there is provided a picture taking apparatus having a plurality of shooting modes in which pictures requiring different capacities for storage on a recording medium are taken, comprising: an imaging device for converting the image of a subject into an electrical picture signal; a first operating member for setting one of the plurality of shooting modes; a recording device for recording the picture signal produced by the imaging device on a recording medium according to a shooting mode set by the first operating member; a second operating member for giving an instruction to erase the picture signal recorded on the recording medium; a control unit for controlling the entire picture taking apparatus, the control unit computing the remaining capacity of the recording medium for each of the shooting modes and, when an erasing instruction is issued by the second operating member, computing the remaining capacity of the recording medium after erasing; and a displaying unit for displaying the remaining capacity of the recording medium computed by the computing means.

According to a further aspect of the invention there is provided a picture taking apparatus for recording the image of a subjects in different picture qualities comprising: imaging means for outputting a picture signal indicative of the image of a subject; recording means capable of recording the image of the subject in different picture qualities on a recording medium the basis of the picture signal; computing means for computing the capacity of the recording medium already used to record pictures or the remaining capacity of the recording medium for each of the picture qualities; and display means for displaying the capacity of the recording medium already used to record pictures for a predetermined interval of time after the termination of recording by the recording means or the remaining capacity of the recording medium after the display of the capacity of the recording medium already used to record pictures.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 shows an arrangement of a picture taking apparatus according to a first embodiment of the invention;

FIG. 2 is a flowchart illustrating the main routine in the first embodiment;

FIG. 4A shows the contents of display in the block "DISPLAY 1" in the subroutine shown in FIG. 3;

FIG. 4B shows the contents of display in the block "DISPLAY 2" in the subroutine shown in FIG. 3;

FIG. 4C shows the contents of display in the block "DISPLAY 3" in the subroutine shown in FIG. 3;

FIG. 4D shows the contents of display in the block "DISPLAY 4" in the subroutine shown in FIG. 3;

FIG. 4E shows the improved contents of display in the block "DISPLAY 1" in the subroutine shown in FIG. 3;

FIG. 4F shows the improved contents of display in the block "DISPLAY 2" in the subroutine shown in FIG. 3;

FIG. 4G shows the improved contents of display in the block "DISPLAY 3" in the subroutine shown in FIG. 3;

FIG. 4H shows the improved contents of display in the block "DISPLAY 4" in the subroutine shown in FIG. 3;

FIG. 6A shows the contents of display in the block "DISPLAY 11" in the subroutine shown in FIG. 5;

FIG. 6B shows the contents of display in the block "DISPLAY 12" in the subroutine shown in FIG. 5;

FIG. 6C shows the contents of display in the block "DISPLAY 13" in the subroutine shown in FIG. 5;

FIG. 8A shows the contents of display in the block "DISPLAY 21" in the subroutine shown in FIG. 7;

FIG. 8B shows the contents of display in the block "DISPLAY 22" in the subroutine shown in FIG. 7;

FIG. 8C shows the contents of display in the block "DISPLAY 23" in the subroutine shown in FIG. 7;

FIG. 8D shows the contents of display in the block "DISPLAY 24" in the subroutine shown in FIG. 7;

FIG. 9 shows an arrangement of a picture taking apparatus according to a second embodiment of the invention;

FIG. 10 is an exterior view of the picture taking apparatus according to the second embodiment;

FIG. 12 is a flowchart illustrating the subroutine "SELECTION" in the subroutine shown in FIG. 10;

FIG. 13 is a flowchart illustrating the subroutine "DISPLAY" in the subroutine shown in FIG. 10;

FIG. 14 is a flowchart illustrating the subroutine "ERASE" in the subroutine shown in FIG. 10;

FIG. 15 is a flowchart illustrating the subroutine "STILL PICTURE" in the subroutine shown in FIG. 10;

FIG. 16 is a flowchart illustrating the subroutine "MOVING PICTURE" in the subroutine shown in FIG. 10;

FIG. 17A shows the contents of display in the block "DISPLAY 1A" in the main routine shown in FIG. 11;

FIG. 17B shows the contents of display in the block "DISPLAY 11A" in the subroutine shown in FIG. 13;

FIG. 17C shows the contents of display in the block "DISPLAY 12A" in the subroutine shown in FIG. 13;

FIG. 17D shows the contents of display in the block "DISPLAY 13A" in the subroutine shown in FIG. 13;

FIG. 17E shows the contents of display in the block "DISPLAY 32A" in the subroutine shown in FIG. 16;

FIG. 17F shows the contents of display in the block "DISPLAY 21A" in the subroutine shown in FIG. 14;

FIG. 17G shows the contents of display in the block "DISPLAY 22A" in the subroutine shown in FIG. 14;

FIG. 17H shows the contents of display in the block "DISPLAY 23A" in the subroutine shown in FIG. 14;

FIG. 17I shows the contents of display in the block "DISPLAY 31A" in the subroutine shown in FIG. 15;

FIG. 17J shows the contents of display in the block "DISPLAY 33A" in the subroutine shown in FIG. 16;

DETAILED DESCRIPTION OF THE PREFERRED EMBODIMENTS

Figure 3:
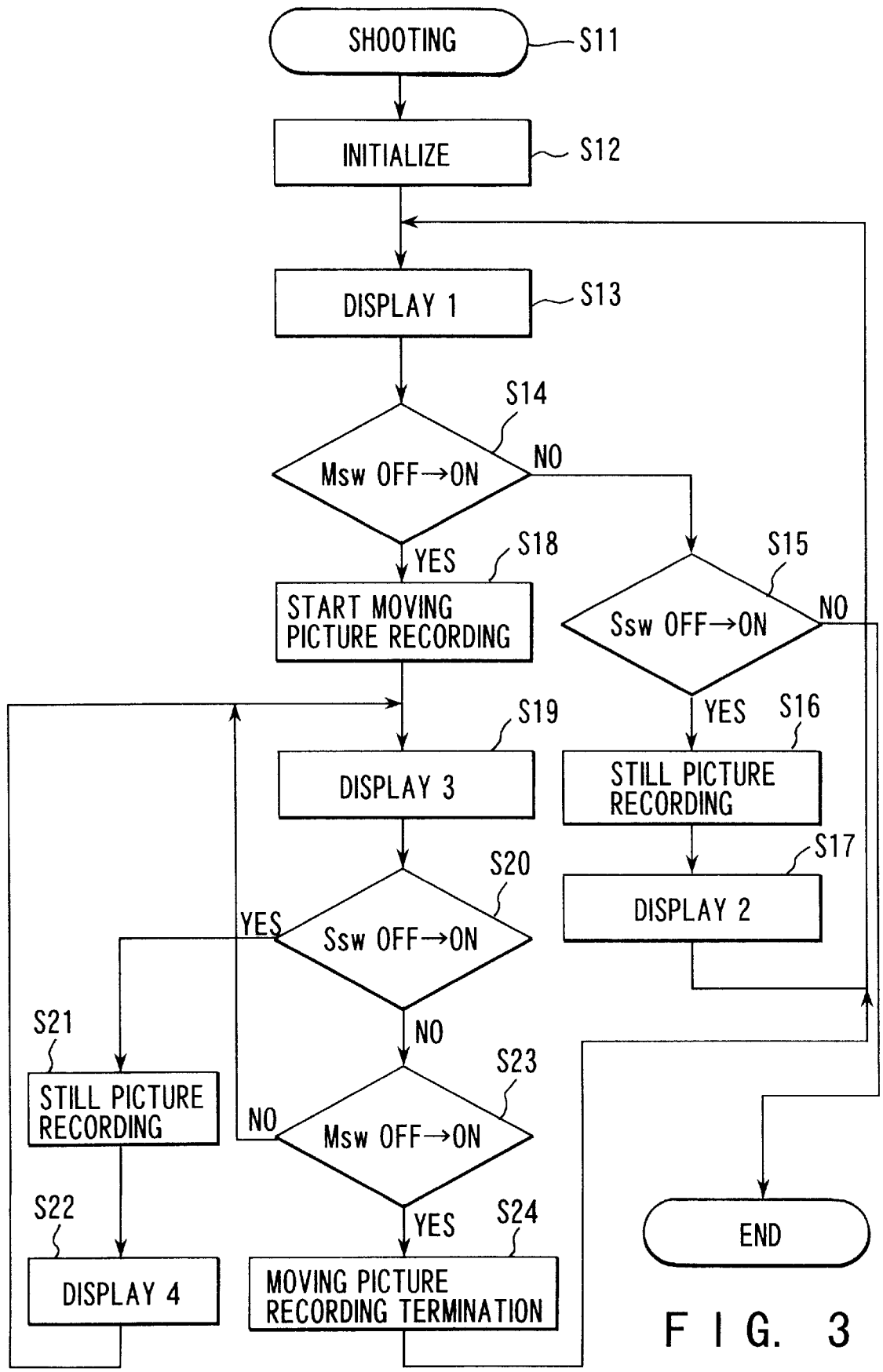
FIG. 3 is a flowchart illustrating the subroutine "SHOOTING" shown in FIG. 2.

Referring now to FIG. 1, there is illustrated an arrangement of a picture taking apparatus according to a first embodiment of the invention, which is constructed from an optical system 1 which forms the image of a subject on an image sensor 2, the image sensor 2 which converts the optical image formed by the optical system into an electrical signal, a recording unit 4 for recording picture information, a display unit 5 for displaying information about the capacity of the recording unit 4, switch (sw) detecting unit 6 for detecting input information from a photographer, and a control unit 3 for controlling the above-described units. More specifically, the sw detecting unit 6 is associated with four switches: an E (Eraser) sw, a D (Display) sw, an M (Movie) sw, and an S (Still) sw.

In the above arrangement, the image sensor 2 provides information of quality varying with control signals from the control unit 3 which responds to the operation of each of the E sw, the D sw, the M sw, and the S sw. The optical system is responsive to a control signal from the control unit optimizes the state of the subject image formed on the image sensor 2. The recording unit 4 records picture information together with shooting time information. The display unit 5 displays information in the recording unit 4 that is managed by the control unit 3. The control unit 3 controls the optical system 1, the image sensor 2, the recording unit 4, the display unit 5, and the sw detecting unit 6.

Hereinafter, reference will be made to the flowchart of FIG. 2 to describe the main routine in the first embodiment. Upon entry to the routine (step S1), the control unit 3 first performs the initialization process in which the timer value t is initialized to t=0 to thereby start the time count operation (step S2). Subsequently, the control unit 3 carries out subroutines "SHOOTING", "DISPLAY", and "ERASE" which are to be described later (steps S3, S4 and S5). If the subroutines are passed through, the timer value t is reset to 0. The control unit 3 makes a decision of whether or not a fixed period of time T has elapsed (step S6). If the fixed period of time T has not elapsed, then the procedure returns to step S3. If, on the other hand, the fixed period of time T has elapsed, the procedure comes to an end (step S7).

Next, reference will be made to a flowchart of FIG. 3 to describe the subroutine "SHOOTING". For shooting, a recording of moving picture is made when the Msw is switched from OFF to ON, while a recording of high-quality still picture is made when the Ssw is switched from OFF to ON.

When the subroutine "SHOOTING" is called (step S11), the control unit 3 initializes the subroutine (step S12) and then displays the contents of "DISPLAY 1" on the display unit 5 (step S13). The contents of "DISPLAY 1" include the remaining time for moving picture (remaining M hms) and the remaining frames for still picture (remaining S frames) as shown in FIG. 4A. In practice, numeric characters are displayed in the "*" positions in FIG. 4A. This is the case in the following description as well.

In subsequent step, the control unit 3 makes a decision of whether the Msw (step S14) is switched from OFF to ON. If the Msw is not ON, then the control unit makes a decision of whether the Ssw is switched from OFF to ON (step S15). If the Ssw is not ON, then the procedure comes to an end (step S25). If, on the other hand, the Ssw is ON, then a recording of high-definition still picture is made (step S16) and the contents of "DISPLAY 2" are displayed for a fixed period of time (step S17). The procedure then returns to step S3. The contents of "DISPLAY 2" include, as shown in FIG. 4B, the number of still pictures already shot (shot S **frames).

On the other hand, when the Msw is ON (step S14), the control unit 3 starts a recording of moving picture of normal quality and a recording of this shooting time (step S18) and then displays the contents of "DISPLAY 3" (step S19). The contents of "DISPLAY 3" include, as shown in FIG. 4C, the recording time (shot M h m **s).

Subsequently, the control unit 3 makes a decision of whether the Ssw is switched from OFF to ON (step S20). If the Ssw is ON, a recording of high-definition still picture is made (step S21) and the contents of "DISPLAY 4" are displayed (step S22). The procedure then returns to step S19. The contents of "DISPLAY 4" include the number of still pictures already shot (shot S frames) and the moving-picture recording time at this time (shot M h m s) as shown in FIG. 4D.

If the Ssw is not ON (step S20), then a decision is made in step S23 as to whether the Msw is switched from OFF to ON. When the Msw is ON, the moving-picture recording is terminated (step S24) and the procedure returns to step S13. When the Msw is not ON in step S14 and moreover the Ssw is not ON in step S15, the present subroutine comes to an end and a return is made to step S4 in the main routine.

The display contents of FIGS. 4A, 4B, 4C and 4D may be modified as shown in FIGS. 4E, 4F, 4G and 4H, respectively. In this case, the number of remaining frames for still picture and the remainder of the recordable time for moving picture are displayed constantly.

Figure 5:
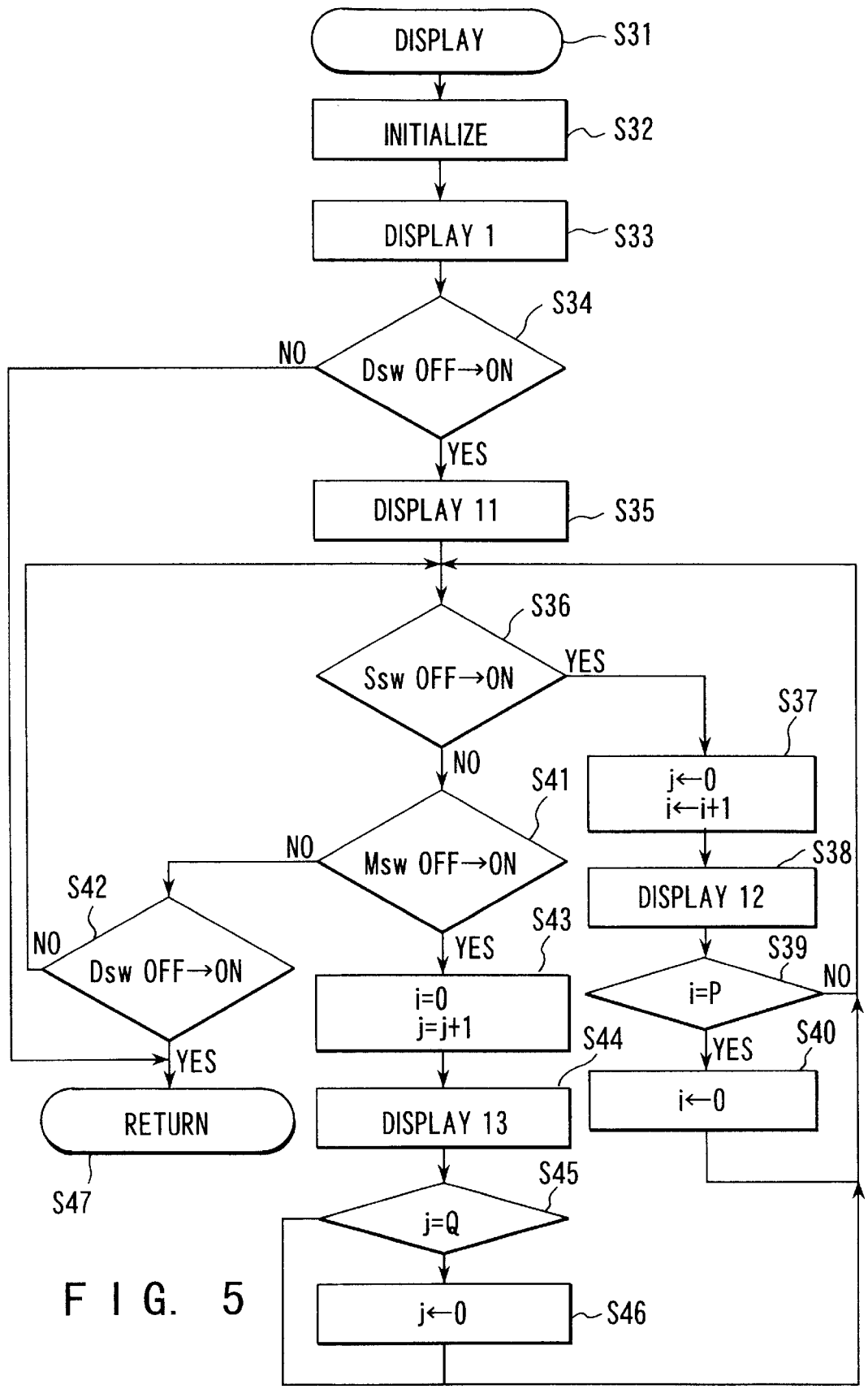
FIG. 5 is a flowchart illustrating the subroutine "DISPLAY" in FIG. 2.

Next, reference will be made to a flowchart of FIG. 5 to describe the subroutine "DISPLAY". To display information about the past shooting, the information is displayed scrolled by the Ssw and Msw with the Dsw switched from OFF to ON. The information about moving picture is displayed for each shot.

When entry is made to the present subroutine (step S31), the control unit 3 first initializes the subroutine (step S32). Here, variables i and j are set to 0. The variable i indicates the number of still pictures already shot, while the variable j indicates the number of shots already taken for moving picture. After that, the contents of "DISPLAY 1" described above are displayed (step S33).

The control unit 3 then checks the state of the Dsw (step S34). If the Dsw is not ON, then the procedure comes to an end (step S47). If, on the other hand, the Dsw is ON, then the contents of "DISPLAY 11" are displayed (step S35). The contents of "DISPLAY 11" include, as shown in FIG. 6A, the number of still pictures already taken (shot S frames), the time already taken to shoot the entire moving picture (A shot M h m s), and the number Q of times the moving picture was shot (** times).

Subsequently, the control unit 3 checks the state of the Ssw (step S36). If the Ssw is ON, the control unit sets the variables (j=0, i=i+1) (step S37) and displays the contents of "DISPLAY 12" (step S38). As shown in FIG. 6B, the contents of "DISPLAY 12" contain the contents of a still picture shot (shot S No), the date of photographing (M D), and the time of photographing (h m s).

Next, the control unit 3 checks a variable P (step S39). When not i=P, the procedure returns to step S36. When i=P, the variable i is initialized to i=0 (step S40) and the procedure then returns to step S36.

When the Ssw is not ON, the control unit checks the state of the Msw (step S41). When the Msw is not ON, the control unit checks the state of the Dsw (step S42). If the Dsw is not ON, then the procedure returns to step S36. If, on the other hand, the Dsw is ON, then the procedure returns to the main routine (S47).

If, in step S41, the Msw is ON, the variables are set such that i=0 and j=j+1 (step S43) and the contents of "DISPLAY 13" are displayed (step S44). As shown in FIG. 6C, the contents of "DISPLAY 13" include the date of shooting for each shot (shot M No M D), the shooting start time (start h m s), and the shooting end time (end h m **s). The moving picture is shot in blocks of a fixed length of time.

When not j=Q in step S45, the procedure returns to step S36. When j=Q, on the other hand, the variable j is initialized to j=0 (step S46) and the procedure returns to step S36. Thus, when the Msw is not ON in step S41 and the Dsw is not ON in step S42, the subroutine comes to an end, so that return is made to step S5 in the main routine.

Figure 7:
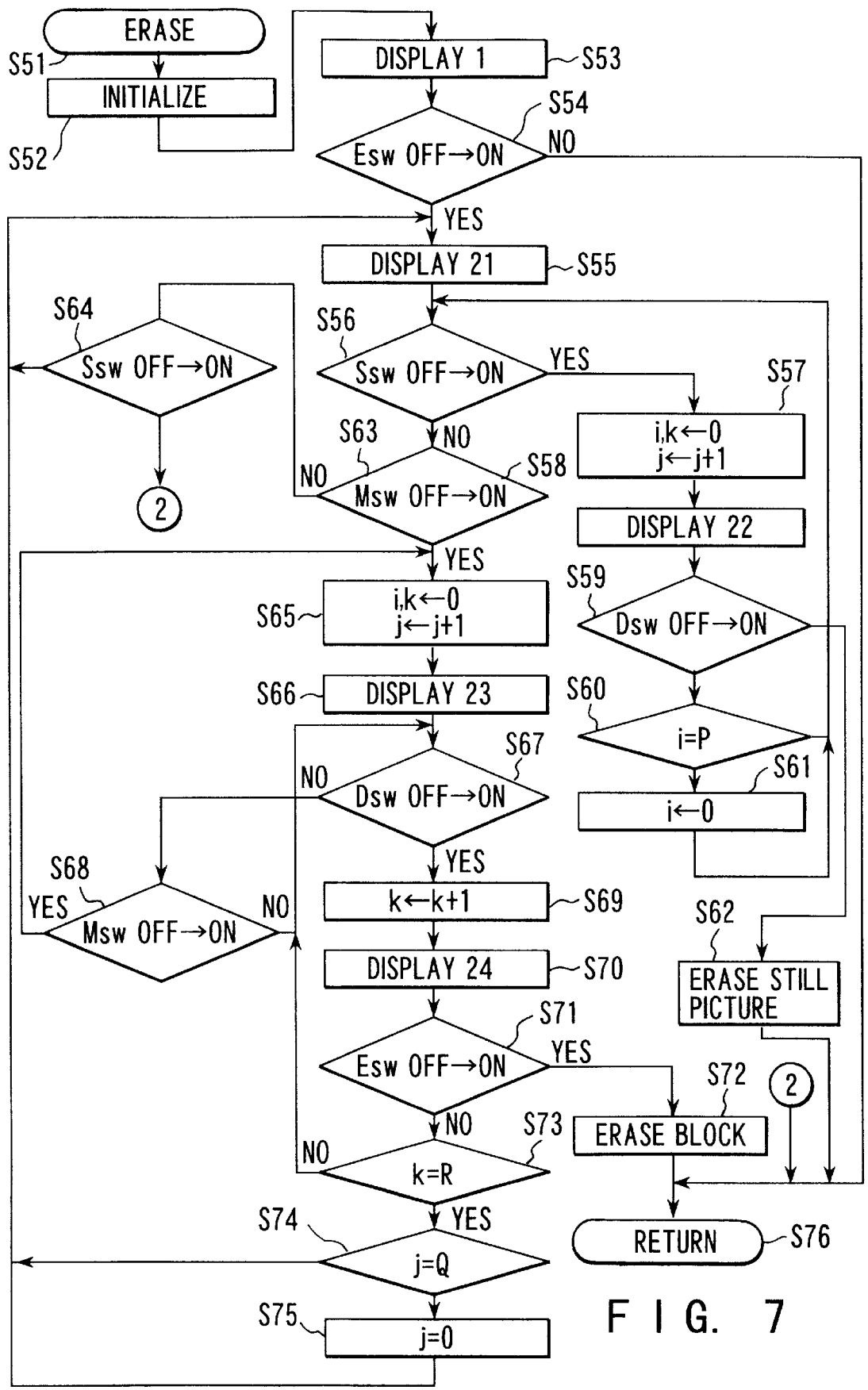
FIG. 7 is a flowchart illustrating the subroutine "ERASE" shown in FIG. 2.

Next, reference will be made to a flowchart of FIG. 7 to describe the subroutine "ERASE". Entry to the erase mode is made by the Esw. A still picture to be erased is selected by the Ssw and erased by the Esw. A moving picture to be erased is selected by the Msw and erased by the Esw. When erasing is performed by the Esw, the procedure immediately leaves the erase mode to ensure that more pictures than were intended will not be erased by mistake. The picture erasing is performed for each block.

When entry is made to this subroutine (step S51), the control unit 3 first performs initialization (step S32). Here, variables i, j and k are each initialized to 0. The variable k is used to specify a moving-picture block. After that, the contents of "DISPLAY 1" are displayed (step S53).

The control unit subsequently checks the state of the Esw (step S54). If the Esw is not ON, return is made to the main routine (step S76). If the Esw is ON, the contents of "DISPLAY 21" are displayed (step S55) as shown in FIG. 8A. The display contents include the number P of still pictures already taken (shot S P frames), the time taken to shoot the entire moving picture and the number Q of moving picture shots (A shot M h m s, the number of shots Q), the number of remaining frames for still pictures (remaining S  frames), and the remaining moving-picture recordable time (remaining M h m **s).

The control unit 3 next checks the state of the Ssw (step S56). If the Ssw is ON, the control unit sets the variables j, k and i such that j=0, k=0, and i=i+1 (step S57) and displays the contents of "DISPLAY 22" (step S58). As shown in FIG. 8B, the contents of "DISPLAY 22" include information about the i-th still picture, i.e., the frame number No., the date of photographing, the time of photographing (shot S No. M D H M S), the number of recorded still pictures after some pictures were erased (ΔS frames), and the motion-picture recording time after part of the motion picture was erased (ΔS H m s).

Next, the control unit 3 makes a decision of whether the switch Esw is switched from OFF to ON (step S59). If the Esw is ON, the i-th still image is erased (overwrite enabled) (step S62) and return is made to the main routine (step S76). In contrast, if the Esw is ON, the control unit 3 makes a decision of whether the variable i equals to P (the number of still pictures taken) (step S60). When not i=P, the procedure returns to step S56. When i=P, i is initialized to i=0 (step S61) and then the procedure returns to step S56.

If, on the other hand, the Ssw is not ON in step S56, then a decision is made in step S63 as to whether the Msw is ON. If the Msw is not ON, a decision is next made as to whether the Esw is ON (step S63). If the Esw is ON, return is made to the main routine. If the Esw is not ON, the procedure returns to step S55.

When the Msw is ON in step S63, the control unit sets the variables such that i=0, k=0, and j=j+1 (step S65) and displays the contents of "DISPLAY 23" (step S66) which, as shown in FIG. 8C, include information about the j-th moving picture shot, i.e., the moving-picture shot No., the date of shooting (shot M No.  M D), the shooting start time (start h m s), the shooting end time (end h m s), and the number R of blocks included (block ).

The control unit 3 subsequently makes a decision of whether the Dsw is ON (step S67). If the Dsw is not ON, then a decision is made as to whether the Msw is ON (step S68). If the Msw is ON, then the procedure returns to step S65. If the Msw is not ON, then the procedure returns to step S67.

If, on the other hand, the Dsw is ON in step S67, the control unit sets the variable k to k=k+1 (step S69) and displays the contents of "DISPLAY 24" (step S70), which, as shown in FIG. 8D, include information about the k-th block in the j-th moving picture shot, i.e., the moving picture shot No., the date of shooting (shot M No. M D), the block No. (block ), the number of recorded still pictures after some pictures were erased (ΔS frames), and the motion-picture recording time (the time taken to shoot the recorded moving picture) after a part of the motion picture was erased (ΔM H m s).

In subsequent step S71, the control unit 3 makes a decision of whether the Esw is ON. If the Esw is ON, the k-th block in the j-th motion picture is erased (overwrite enabled) (step S72) and return is made to the main routine. If the Esw is ON, a decision is made as to whether k equals R (=the number of blocks in the j-th moving picture already shot) (step S73). When not k=R, the procedure returns to step S67. When not j=Q (=the number of times the moving picture was shot), the procedure returns to step S55. When j=Q, j is initialized to j=0 (step S75) and the procedure returns to step S55. When the Esw is turned from OFF to ON again in step S54, the procedure goes to step S6 in the main routine.

According to the first embodiment described above, after pictures each with different quality (a high-definition still picture and a moving picture) have been recorded simultaneously, the number of remaining frames and the remainder of the recordable time are always displayed, allowing the photographer to understand the shooting conditions easily. Further, with erasing, the capacity of the recording medium after erasing is displayed, allowing the photographer to take pictures in an efficient manner.

Next, FIG. 9 shows an arrangement of a picture taking apparatus according to a second embodiment of the invention. As shown, the apparatus is constructed from a zoom optical system 12 which forms the image of a subject onto an imager 13, the imager 13 (high-density pixels) which converts the optically formed subject image into an electrical signal, a signal processing unit 14 which transfers the signal from the imager to an RISC (Reduced Instruction Set Computer) microcomputer 11 in the form of a digital signal, an MO (Magneto Optical) recording apparatus 15 which records picture information shot, a (removable) monitor 17 which displays picture information, an LCD (Liquid Crystal Display) 16 for displaying information, a switch circuit 18 comprising switches a to f accessible by the photographer, and the RISC microcomputer 11 which controls the entire apparatus and monitors the MO drive 15 to display the empty capacity in the MO apparatus on the LCD 16 in a form easy to understand.

In such an apparatus, when a shot is taken while the RISC microcomputer 11 monitors the state of the switch circuit 18, a high-definition still picture, a normal still picture, or a normal moving picture is displayed on the monitor 17 and recorded by the MO apparatus 15 together with shooting time information. Further, by monitoring the recording capacity, the empty capacity of the MO apparatus is displayed in real time on the LCD 16 in terms of the number of remaining frames or remaining time by picture type. Picture types include high-definition still pictures, normal still pictures, and normal moving pictures. Video information and shooting time information in the MO apparatus are displayed on the monitor 17 and the LCD 16, respectively. With erasing, the capacity that becomes available for recording after erasing is simultaneously displayed for each picture type.

FIG. 10 is an exterior view of the apparatus of the second embodiment. The monitor can be separated from the apparatus body. The apparatus body is equipped with a power switch 21 and an eject button 22 used to take an MO disk 15 out of the apparatus body.

Figure 11:
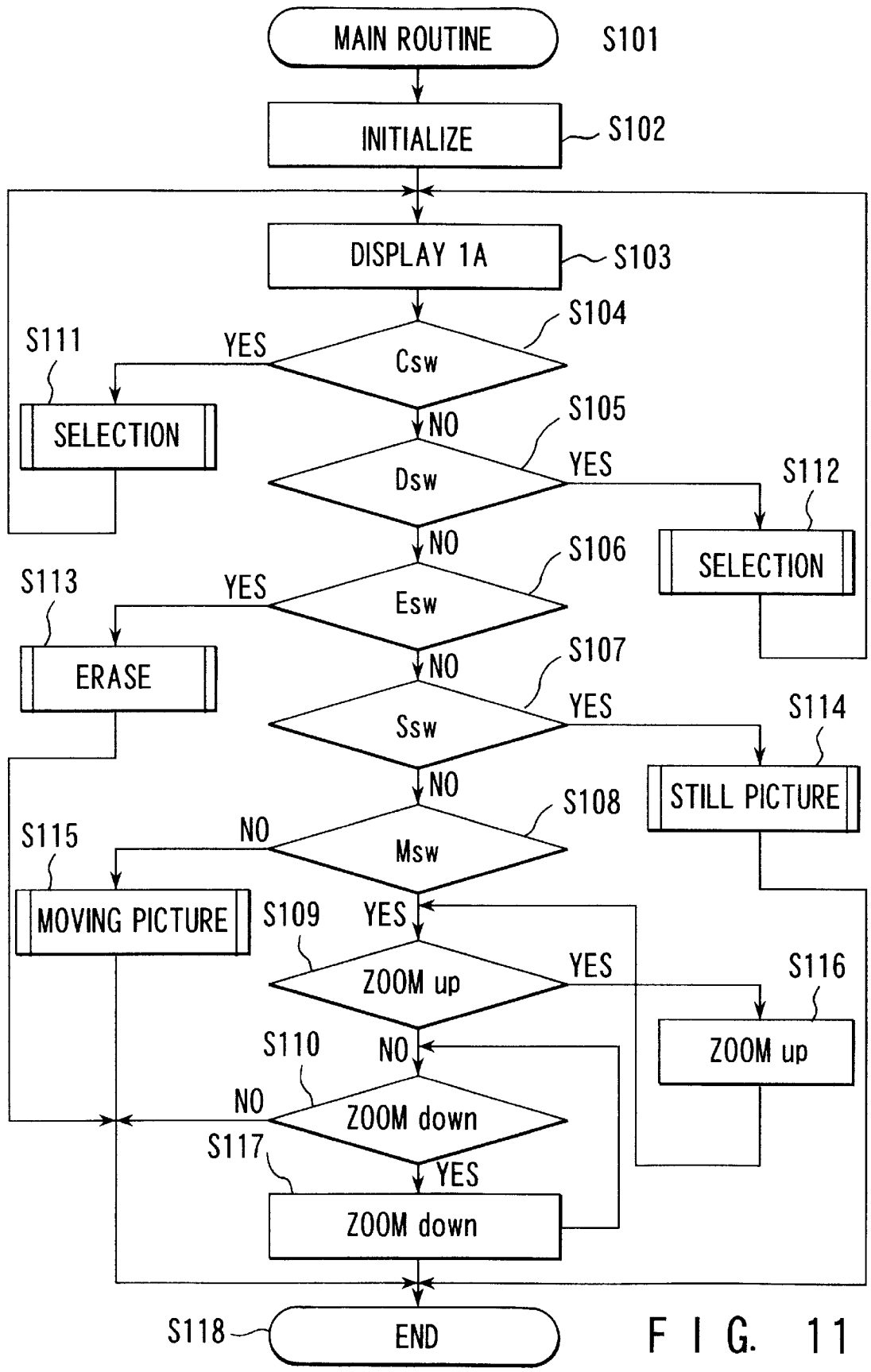
FIG. 11 is a flowchart illustrating the main routine in the second embodiment.
Figure 18A:
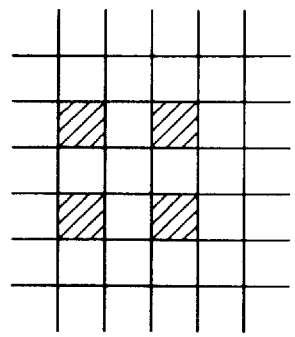
FIG. 18A is a diagram for use in explanation of the manner in which signals are read from selected picture elements of a high-definition image sensor.
Figure 18B:
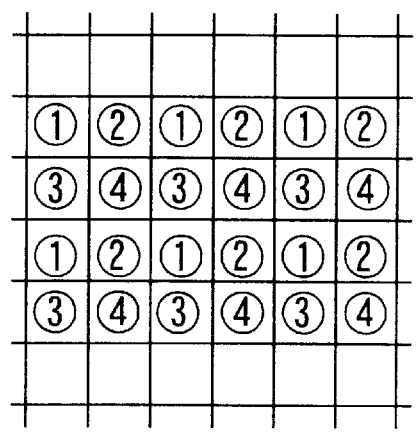
FIG. 18B is a diagram for use in explanation of the manner in which signals are read from the image sensor with the integration time staggered during one field.
Figure 18C:
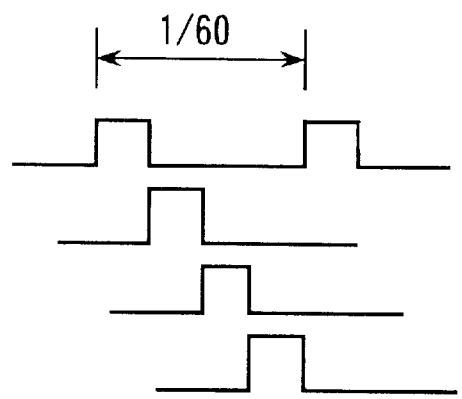
FIG. 18C is a diagram for use in explanation of the manner in which signals are output through the addition of picture elements.
Figure 18D:
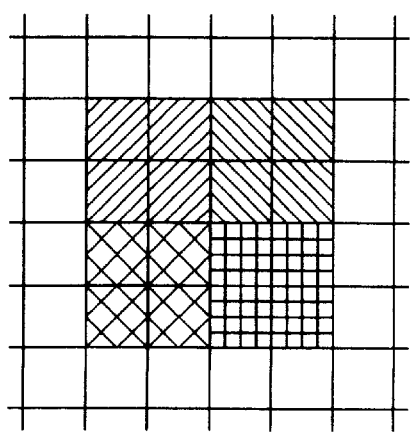
FIG. 18D shows each field.
Figure 18E:
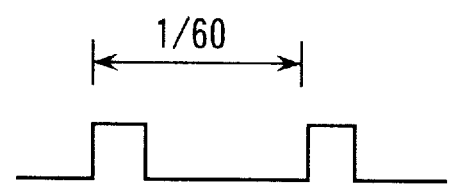
FIG. 18E shows an output signal for each pixel.

Hereinafter, reference will be made to a flowchart of FIG. 11 to describe the main routine in the second embodiment.

When entry is made to the main routine (step S101), the SIRC microcomputer 11 first initializes conditions (step S102) and then displays the contents of "DISPLAY 1A" on the LCD 16 (step S103), which, as shown in FIG. 17A, include the the number of remaining frames for high-definition still pictures (remaining His 30 frames), the number of remaining frames for normal still pictures (remaining NS 300 frames), and the remaining recordable time for moving picture (remaining M 10 min.). In this display, <s> indicates the selected mode.

In subsequent steps S104 to S110, the state of each of switches in the switch circuit is checked in sequence. When a switch Csw (for switching still picture modes; it is initially set to the high-definition still picture mode) is ON, a subroutine "selection" to be described later is carried out (step S111) and the procedure returns to step S3. When a switch Dsw (display mode) is ON, a subroutine "display" to be described later is carried out (step S112) and the procedure returns to step S3.

When a switch Esw (erase mode) is ON, a subroutine "erase" is carried out (step S113) and the main routine comes to an end (step S118). When a switch Esw (erase mode) is ON, a subroutine "erase" is carried out (step S113) and the main routine comes to an end (step S118). When a switch Ssw (still picture mode) is ON, a subroutine "still picture" to be described later is carried out (step S114) and the main routine comes to an end.

Further, when a switch Msw (moving picture mode, start/stop) is ON, a subroutine "moving picture" to be described later is carried out (step S115) and the main routine comes to an end. When a zoom switch upsw is ON, the zoom optical system 12 is driven in the direction of tele focal lengths at a fixed speed (step S116). When a zoom switch downsw is ON, the zoom optical system 12 is driven in the direction of wide-angle focal lengths at a fixed speed (step S117).

Next, reference will be made to a flowchart of FIG. 12 to describe the procedure in the subroutine "selection". Here, a selection between high-definition and normal still pictures is made.

When entry is made to the subroutine (step S120), the functions of the zoom switches are made different from their inherent functions. First, a decision is made as to whether the zoom switch upsw is ON (step S121). When the switch is ON, the high-definition still picture mode is set (step S124) and the procedure then goes to step S123. When the switch upsw is not ON, a decision is made as to whether the zoom switch downsw is ON (step S122). When the switch downsw is ON, the normal still picture mode is set (step S125) and the procedure then goes to step S123. In step S123, a decision is made as to whether the switch Csw is ON. When it is not ON, the procedure returns to step S121. When it is ON, on the other hand, the mode is established and return is made to step S103 in the main routine (step S126).

Next, reference will be made to a flowchart of FIG. 13 to describe the procedure in the subroutine "display". To display information about pictures already shot, the information is displayed scrolled by means of the zoom switches upsw (still pictures) and downsw (moving pictures). The information about moving picture is displayed for each shot. By selecting this subroutine, the functions of the zoom switches are made different from their inherent functions.

When this subroutine is initiated (step S131), the RISC microcomputer 11 first performs the initialization process (step S132) and then displays the contents of "DISPLAY 11A" on the LCD 16 (step S133). The display contents of "DISPLAY 11A" are shown in FIG. 17B and include the number of still pictures already shot P (shot S 29 frames) (shot NS 10 frames SHi 19 frames) and the number of times moving picture was shot Q and the time taken to shoot the entire moving picture (shot AM 3 6:00).

A decision is next made as to whether the zoom switch upsw is ON (step S134). When the switch is ON, a variable i is incremented by one (step S135) and the contents of "DISPLAY 12A" are displayed (step S136). The contents of "DISPLAY 12A" are shown in FIG. 17C and include the contents of a frame being shot (high quality/normal the date and time of photographing) (shot HiS No. 3 95. 10. 10 15:00).

A decision is made as to whether a variable P is equal to i (step S137). When not i=P, the procedure returns to step S134. When i=P, the variable i is initialized to 0 (step S138) and the procedure then returns to step S134. When the switch upsw is not ON, a decision is made as to whether the switch downsw is ON (step S139). When the switch downsw is not ON, a decision is made as to whether the switch Dsw is ON (step S140). When the Dsw is not ON, the procedure returns to step S134. When the Dsw is ON, return is made to the main routine (step S145).

When, in step S139, the switch downsw is ON, the variable j is incremented by one (step S141) and the contents of "DISPLAY 13A" are displayed (step S142). The contents of "DISPLAY 13A" include, as shown in FIG. 17D, the date of shooting, the shooting start time, and the shooting end time of each shot (shot M No. 1 95. 10. 10 13:00:00 13:03:00).

A decision is made as to whether the variable j equals Q (step S143). When not j=Q, the procedure returns to step S134. When j=Q, the variable j is initialized to 0 (step S144) and the procedure then returns to step S134. When the switch downsw is not ON in step S139 and the switch Dsw is not ON in step S140, return is made to step S13 in the main routine.

Next, reference will be made to FIG. 14 to describe the subroutine "erase". In the erase mode, erasing is performed by simultaneously operating the switches Dsw and Csw while information is scrolled by means of the zoom switches upsw (still picture) and downsw (moving picture). The motion picture is displayed and erased for each shot. In this subroutine, the zoom switches are made to have different functions from their inherent functions.

When the subroutine "erase" is initiated (step S151), the RISC microcomputer 11 initializes variables i, j to 0 (step S152) and then displays the contents of "DISPLAY 21A" (step S153), which, as shown in FIG. 17F, include the number of still pictures already taken P (shot HiS 29 frames shot NS 10 frames), the time taken to shoot the entire moving picture and the shot number Q (shot AM No. 3 06:00), the number of remaining frames for high-definition and normal still pictures (remaining HiS 30 frames remaining NS 300 frames), and the remaining recordable time for motion picture (remaining M 10 min.).

In subsequent step S154, a decision is made as to whether the zoom switch upsw is ON. When the switch upsw is ON, the variable i is incremented by one (step S155) and the contents of "DISPLAY 22A" are displayed (step S156). The contents of "DISPLAY 22A" include, as shown in FIG. 17G, information on the i-th still picture, the frame No., the date of photographing, the time of photographing (shot NS No. 4 95. 10. 10 10:12:00), the number of still pictures recorded after erasing (ΔHiS 0.1 frames ΔNS 1 frame), and the motion picture recording time after erasing (ΔM 00:00:02).

A decision is next made as to whether the switches Dsw and Csw are simultaneously turned ON (step S157). When they are simultaneously operated, the i-th still picture is erased (overwrite enabled) (step S168) and return is made to the main routine (step S169). On the other hand, when the switches Dsw and Csw are not operated simultaneously, a decision is made as to whether j=Q (step S158). When not i=P, the procedure returns to step S154. When i=P, the variable i is initialized to 0 (step S159) and the procedure returns to step S154.

On the other hand, when the zoom switch upsw is not ON in step S154, a decision is next made as to whether the zoom switch downsw is ON (step S161). When the switch downsw is not ON, a decision is made as to whether the switch Esw is ON (step S162). When the switch Esw is not ON, the procedure returns to step S153. When the Esw is ON, return is made to the main routine (step S169).

When, in step S161, the zoom switch downsw is ON, the variable j is incremented by one (step S163) and the contents of "DISPLAY 23A" are displayed on the LCD 16 (step S164). The contents of "DISPLAY 23A" include, as shown in FIG. 17H, information on the j-th moving picture shot, the shot No., the date of shooting, the time of shooting (shot M No. 3 95. 10. 10 14:10:10 14:12:00), the number of still pictures recorded after erasing (ΔHIS 30 frames ANS 300 frame), and the motion picture recording time after erasing (ΔM 00:01:00).

In subsequent step S165, a decision is made as to whether the switches Dsw and Csw are turned ON simultaneously. When they are not operated simultaneously, a decision is made as to whether j=Q (step S166). When not j=Q, the procedure returns to step S154. When j=Q, on the other hand, the variable i is initialized to 0 (step S167) and the procedure returns to step S154. When the switches Dsw and Esw are operated simultaneously, the j-th motion picture shot is erased (overwrite enabled) (step S168) and return is made to the main routine (step S169).

Next, reference will be made to FIG. 15 to describe the subroutine "still picture". When this subroutine is initiated (step S170), initialization is first performed (step 171) and autofocusing (AF) and autoexposure (AE) are next performed (steps S172 and S173). AF and AE are both performed by reading images from the imager several times. For AF, use may be made of the so-called contrast method (the mountain climbing method or predictive method; see Japanese Unexamined Patent Publication 3-186360 for example).

In subsequent steps S174 and S175, the Ssw1st and Ssw2nd are checked. If the Ssw1st is OFF, the procedure goes to step S180. If the Ssw1st and Ssw2nd are both ON, a still picture is taken (step S176) and then recorded according to the set still picture mode (high definition or normal) (step S177). At the same time, the photographing time information is recorded as ID information (step S178).

In subsequent step S179, the contents of "DISPLAY 31" are displayed on the LCD 16, which, as shown in FIG. 17I, include the frame No., the date (shot NS No. 11 95. 10. 11), the number of remaining frames (high definition, normal) (remaining HiS 29 frames remaining NS 299 frames), and the remaining recordable time (remaining M 9 min.). If the monitor is available, the still picture taken is displayed on the monitor. Then, return is made to the main routine (S180).

Next, reference will be made to FIG. 16 to describe the subroutine "moving picture". Upon entry to the subroutine (step S181), the RISC microcomputer 11 performs the initialization (step S181), records information on photographing as ID information (date, time, etc.) (step S183), takes and records a shot (step S184), and displays the contents of "DISPLAY 32" (step S185).

The display contents of "DISPLAY 32" are shown in FIG. 17 and include the shot No., the shooting time (shot M No. 4 00:05:00), the number of remaining frames (high definition, normal) (remaining HiS 14 frames remaining NS 149 frames), and the moving picture remaining recordable time (remaining M 4 min.). If, at this time, the monitor is available, the moving picture shot may be displayed on the monitor.

In subsequent step S186, the microcomputer 11 performs AF and AE. In this step, the microcomputer optimizes the integration time and the lens setting on the basis of signals read from the imager. In step S187, the state of focus is checked. In the case of out-of-focus state, the lens is moved to focus on a subject (S188). In subsequent step S189, a decision is made as to whether the Msw is ON. If the decision is that the Msw is ON, information at the termination of shooting is recorded as ID information (step S199) and return is made to the main routine (step S200).

If, in step S189, the Msw is not ON, a decision is made as to whether the Ssw1st is ON (step S190). If the Ssw1st is OFF, the procedure returns to step S184. If, on the other hand, the Ssw1st is ON, AF and AE are performed again (step S191) and the contents of "DISPLAY 33A" are displayed on the LCD 16 (step S192). As shown in FIG. 17J, the contents of "DISPLAY 33A" include the still picture frame No. the date (shot HiS No. 30 95. 10. 12), the motion picture shot No., the shooting time of this shot (shot M No. 4 00:09:57), the number of remaining frames (high definition, normal) (remaining HiS warning remaining NS 5 frames), and the remaining motion picture recordable time (remaining M 6 min.).

Next, shooting and recording of a moving picture are made (step S193) and the Ssw1st and Ssw2nd are examined (steps S194 and S195). If the Ssw1st is OFF, the procedure returns to step S184. If the Ssw2nd is ON, a still picture is shot and then recorded according to the still picture mode set (step S196). After photographing time information has been recorded as ID information (step S198), the procedure returns to step S184.

Although the second embodiment was described as using an LCD for information display, the information may be displayed within the viewfinder. Further, necessary information may be displayed simultaneously on the camera. Information other than the remaining amount may be selectively displayed by option. The imager may be implemented by a single image sensor chip of high picture quality or by a combination of a plurality of image sensor chips of normal picture quality. For example, instead of using an image sensor chip having two million pixels, four image sensor chips each with five hundred thousand pixels may be used, which would provide the same level of precision. For reading a moving picture or normal-quality still picture from the imager, signals may be selectively read from the imager or signals read from the imager may be selectively sampled at the A/D sampling time. When picture signals are selectively read from the imager, the timing of reading of the signals may be staggered for high-speed shooting. In low light situations, pixel addition may be performed to increase the signal-to-noise ratio (which will be described later in conjunction with FIG. 18). The recording medium need not be an MO disk and may be any type of random accessible medium. For example, use may be made of a memory card, a video disk, or the like.

FIG. 18 shows the modes of use of signals from a high-definition image sensor. For high-definition still picture, all the pixels are used. For moving picture and normal still picture, however, signals read from selected pixels are used. FIG. 18A shows a typical case of selective reading of pixels. FIG. 18B shows a case where the timing of reading of signals from pixels is staggered during one field interval to make a recording of quadruple-speed picture. That is, signals are read and recorded for each of groups 1, 2, 3, and 4. FIG. 18C shows an example of adding selected pixels together for signal readout, which is similar to the case where signals are read from selected pixels as shown in FIG. 18A. With pixel addition, an improvement in step signal-to-noise ratio is expected.

As described in detail, the remaining frames and the remaining time are displayed after pictures of different picture quality (high-definition still picture, moving picture, and normal still picture) are shot simultaneously, thereby allowing the photographer to understand the shooting situation easily. Further, when some recorded pictures are erased, the remaining capacity of the recording medium which becomes recordable after erasing is displayed, allowing the photographer to shoot efficiently.

According to the invention, there is provided a picture taking apparatus which is adapted to indicate the remainder of the recording capacity of a recording medium on which a moving picture and a still picture of higher quality than the moving picture, which are provided from the same image sensor, are simultaneously recorded.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general invention concept as defined by the appended claims and their equivalents.

What is claimed is:

1. An apparatus for recording both moving and still pictures comprising:

imaging means for converting an image of a subject into a picture signal;

mode setting means for setting one of a still picture recording mode and a moving picture recording mode with respect to the picture signal;

recording means for recording one of a still picture and a moving picture on a recording medium in the mode set by the mode setting means;

computing means for computing a remaining capacity of the recording medium for each of the still picture mode and the moving picture mode; and display means for simultaneously displaying the remaining capacity of the recording medium for each of the still picture mode and the moving picture mode;

wherein said apparatus is capable of switching to the still picture recording mode in response to an output from said mode setting means while a moving picture is being taken.

2. The apparatus according to claim 1, wherein the still picture mode set by the mode setting means includes a high-quality still picture mode and a normal-quality still picture mode, and the computing means computes the remaining capacity of the recording medium for each of the high-quality still picture mode and the normal-quality still picture mode.

3. The apparatus according to claim 1, further comprising erasing means for erasing information recorded on the recording medium, and wherein, when an erasing operation is performed, the computing means thereafter computes the remaining capacity of the recording medium.

4. The apparatus according to claim 3, wherein the erasing means is adapted to erase the moving picture on a block-by-block basis, and the computing means computes the remaining capacity of the recording medium with respect to moving pictures on a block-by-block basis.

5. The apparatus according to claim 1, wherein the mode setting means includes display mode setting means for setting display modes, and the display means displays the remaining capacity of the recording medium when the display mode setting means is operated.

6. The apparatus according to claim 1, further comprising monitor means for displaying a picture produced by the imaging means, the monitor means displaying the remaining capacity of the recording medium simultaneously with the picture produced by the imaging means.

* * * * *